May 27, 1958

H. J. CICHANOWICZ 2,836,734

VOLTAGE CONTROL APPARATUS

Filed April 9, 1957

May 27, 1958     H. J. CICHANOWICZ     2,836,734

VOLTAGE CONTROL APPARATUS

Filed April 9, 1957     3 Sheets-Sheet 2

United States Patent Office 2,836,734
Patented May 27, 1958

2,836,734
VOLTAGE CONTROL APPARATUS

Henry J. Cichanowicz, Baltimore, Md., assignor to Westinghouse Electric Corporation, East Pittsburgh, Pa., a corporation of Pennsylvania Application April 9, 1957, Serial No. 651,601

6 Claims. (Cl. 307—81)

The present invention relates, in general, to electrical voltage commutating or sampling devices and more particularly to electronic voltage sampling or switching devices employing transistors as the switching elements.

Voltage commutators or sampling switches are used extensively in control and data handling applications. These switching devices can be of either of the electromechanical or the electronic varieties. The electromechanical type of device has the disadvantage that it is subject to mechanical wear and has very definite sampling speed characteristics. The prior art electronic type of device has off-set voltages measurable in volts or short-circuit impedances measurable in hundreds of ohms.

It is an object of the present invention to provide an improved electrical voltage sampling or switching device.

It is a different object of the present invention to provide an improved voltage sampling device operative at higher sampling speeds and having improved switching or sampling characteristics.

It is another object of the present invention to provide improved voltage switching or sampling devices operative at switching speeds in the order of a fraction of a microsecond.

It is a further object of the present invention to provide an improved voltage or signal sampling device having off-set voltage points in the order of a millivolt or less and improved impedance characteristics regarding open-circuit and short-circuit operations.

These and other objects and advantages of the present invention will become apparent in view of the following description taken in conjunction with the drawings, wherein.

Figure 1:
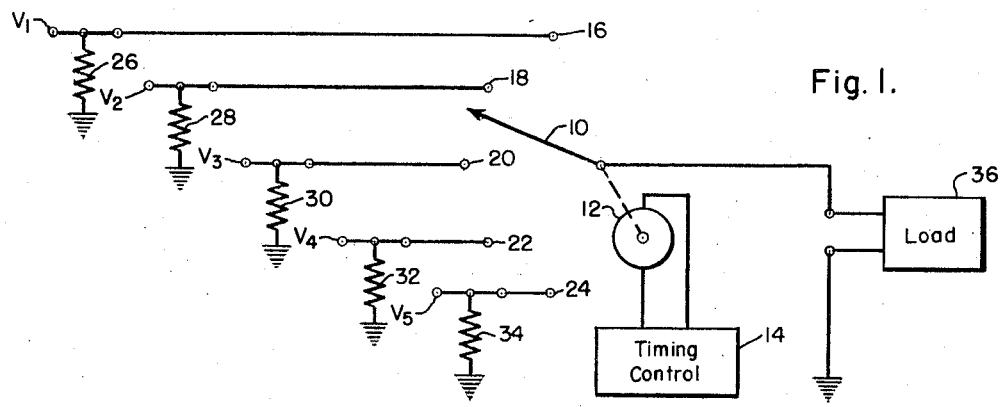
Figure 1 is a schematic view illustrative of prior art electromechanical voltage switching devices.

In Fig. 1 there is shown a prior art type of electromechanical voltage switching device which is operative to successively and individually apply a plurality of input voltages to a load device. In Fig. 1 there is shown a rotating contact arm 10 which is rotated by a motor 12 as controlled by a timing control device 14. The rotating contact arm successively contacts the plurality of terminals 16, 18, 20, 22 and 24. The terminal 16 is connected to a first input voltage source represented by the resistor 26. The terminal 18 is connected to a second input voltage source represented by the resistor 28. The terminal 20 is connected to a third input voltage source represented by the resistor 30. The terminal 22 is connected to a fourth input voltage source represented by the resistor 32, and the terminal 24 is connected to a fifth input voltage source as represented by the resistor 34.

In the operation of the electromechanical voltage switching device shown in Fig. 1, as the contact arm 10 is rotated, it successively contacts the terminals 16 through 24, as shown in Fig. 1, such that the respective input voltage sources are successively applied to the load 36 as determined by the timing control 14 operating through the motor 12 which controls the rotation of the contact arm 10.

Figure 2:
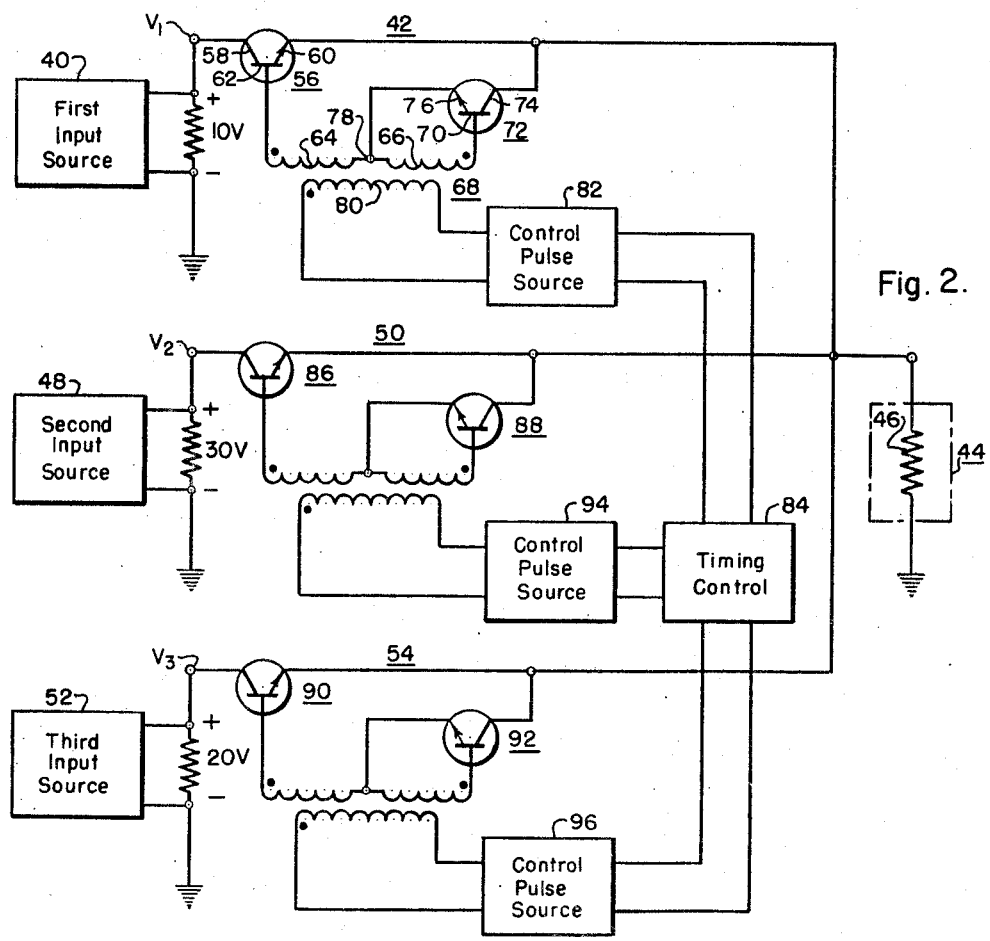
Fig. 2 is a schematic showing of the voltage control apparatus in accordance with the present invention.

In Fig. 2 there is shown voltage control apparatus in accordance with the teachings of the present invention, wherein a first input voltage source 40 is connected through a first switching circuit 42 to a load device 44 schematically illustrated by the resistor 46. A second input voltage source 48 is shown connected through a second similar switching circuit 50 to the load device 44, and a third input voltage source 52 is shown connected through a third similar switching circuit 54 to the load device 44.

The first switching circuit 42 includes a first transistor device 56 having a collector electrode 58, an emitter electrode 60 and a base electrode 62. The collector electrode 58 is connected through the first input voltage source 40 to ground potential as shown in Fig. 2. The base electrode 62 is connected through a first secondary winding 64 and a second secondary winding 66 of a transformer 68 to the base electrode 70 of a second transistor device 72. The latter second transistor device 72 also has a collector electrode 74 and an emitter electrode 76. The latter emitter electrode 76 is connected to a center tap junction 78 between the secondary windings 64 and 66 of the transformer 68. The latter collector electrode 74 is connected to the emitter electrode 60 of the first transistor device 56, and also through the load device 44 to ground potential as shown in Fig. 2. The transformer 68 includes a primary winding 80 connected to a control pulse source 82 which, in turn, is controlled by a suitable timing control 84.

The second switching circuit 50 similarly includes a first transistor device 86 and a second transistor device 88, and is similar in circuit arrangement and operation to the first transistor device switching circuit 42. The third switching circuit 54 includes a first transistor device 90 and a second transistor device 92, and is similar in circuit arrangement and operation to the first switching circuit 42.

The timing control 84 is connected to each of the control pulse sources 82 for the first switching circuit 42, 94 for the second switching circuit 50, and 96 for the third switching circuit 54, such that the timing control 84 may be operative to sequentially energize the latter control pulse sources to provide successive control pulses to the respective primary windings of the transformers as may be desired for each of the switching circuits 42, 50 and 54.

Figure 3:
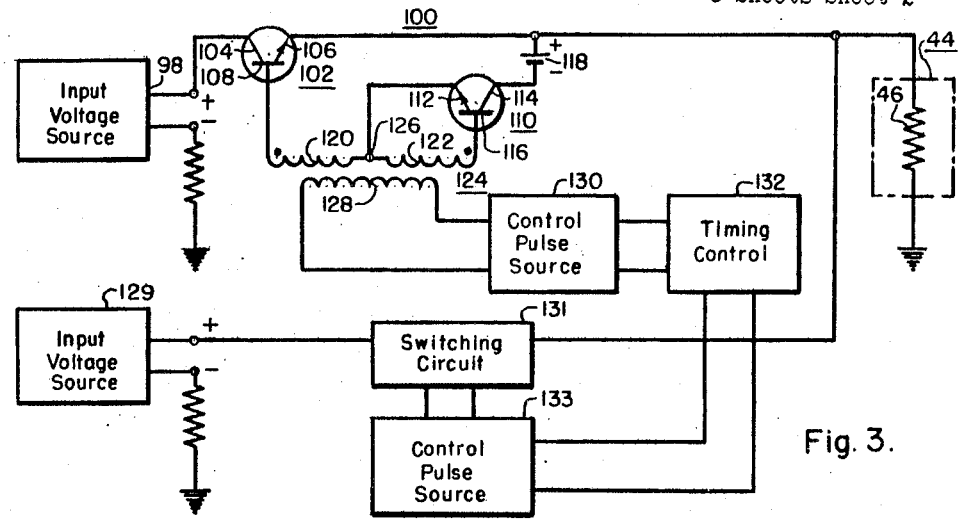
Fig. 3 shows a modification of the voltage control apparatus in accordance with the present invention.

In Fig. 3 there is shown a modification of the voltage control apparatus in accordance with the present invention wherein an input voltage source 98 is connected through a switching circuit 100 to a load device 44 similar to the load device shown in Fig. 2. The switching circuit 100 includes a first transistor device 102 having a collector electrode 104, an emitter electrode 106, and a base electrode 108. There is further provided a second transistor device 110 including an emitter electrode 112, a collector electrode 114 and a base electrode 116. A battery or similar bias potential source 118 is connected between the collector electrode 114 of the second transistor device 110 and the emitter electrode 106 of the first transistor device 102. The collector electrode of the latter first transistor device 102 is connected through the input voltage source 98 to ground potential, as shown in Fig. 3. The base electrode 108 is connected through a first secondary winding 120, and a second secondary winding 122 of a transformer 124 to the base electrode 116 of the second transistor device 110. The emitter electrode 112 of the second transistor device 110 is connected to a circuit junction 126 between the first secondary winding 120 and the second secondary winding 122 of the transformer 124. The latter transformer 124 includes a primary winding 128 connected to a control pulse source 130 which, in turn, is controlled by a timing control 132. It should be understood that in accordance with the teachings of the present invention there may be a plurality of input voltage sources, such as input voltage source 129, similar to the input voltage source 98 respectively connected to the load device 44 through a plurality of switching circuits, such as switching circuit 131, similar to the switching circuit 100 shown in Fig. 3. In this respect, the timing control 132 would then sequentially or as may be desired, time the operation of the control pulse sources 130 and 133 for each switching circuit such that the switching circuits were sequentially or as may be desired, operated to apply the input voltage sources to the load device 44.

Figure 4:
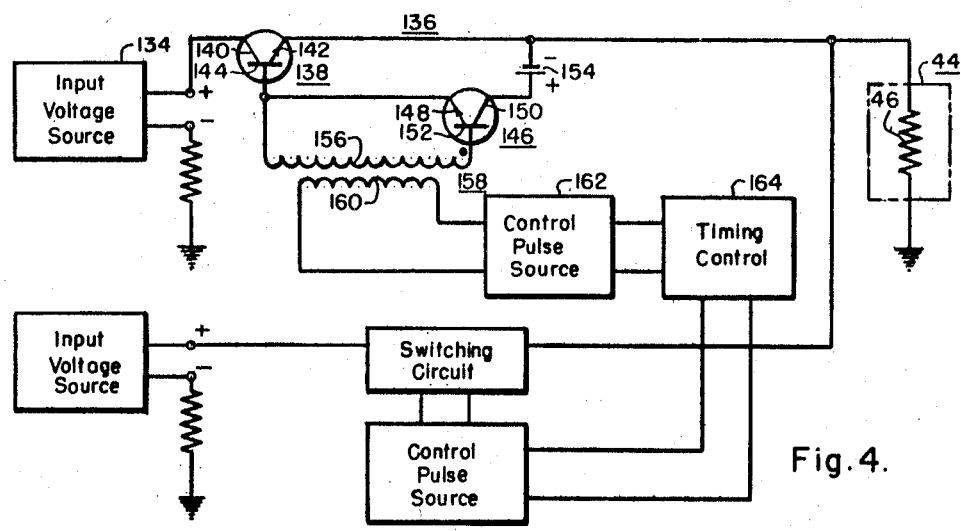
Fig. 4 shows a still further modification of the voltage control apparatus in accordance with the present invention.

A further modification of the voltage control apparatus in accordance with the present invention is shown in Fig. 4 wherein an input voltage source 134 is connected through a switching circuit 136 to the load device 44. The switching circuit 136 includes a first transistor device 138 having a collector electrode 140, an emitter electrode 142 and a base electrode 144. A second transistor device 146 is provided including an emitter electrode 148, a collector electrode 150, and a base electrode 152. In this respect, it should be noted that the transistor devices illustrated are of the NPN type, however, it should be understood that the PNP type may be employed with suitable voltage biases and polarity arrangements being provided in accordance with the teachings of the present invention as would be well known to persons skilled in this particular art. A bias voltage or potential source 154 is provided between the collector electrode 150 of the second transistor device 146 and the emitter electrode 142 of the first transistor device 138. The emitter electrode 148 of the second transistor device 146 is connected to the base electrode 144 of the first transistor device 138. The base electrode 152 of the second transistor device is connected through the secondary winding 156 of a transformer 158 to the base electrode 144 of the first transistor device 138. The primary winding 160 of the transformer device 158 is connected to a control pulse source 162 which, in turn, is controlled by a timing control 164. In this respect, it should be understood that a plurality of input voltage sources, such as the input voltage source 134, may be connected through a like plurality of switching circuits similar to the switching circuit 136 to the load device 44 with the timing control being operative to sequentially or as may be desired, energize the control pulse sources for each of the switching circuits to sequentially or as may be desired, apply the input voltages from the respective plurality of input voltage sources to the load device 44 in accordance with the teachings of the present invention.

Figure 5:
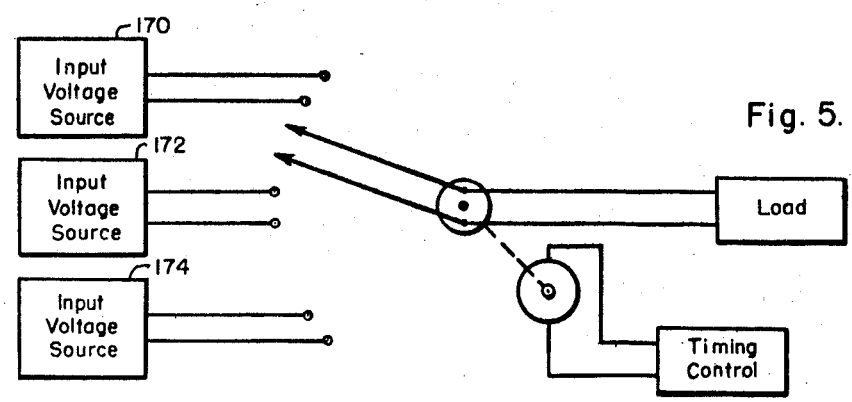
Fig. 5 is illustrative of an additional modified form of the prior art electromechanical switching type of apparatus.

In Fig. 5 a prior-art type of double-pole electromechanical switch device is illustrated wherein the respective input voltage sources 170, 172 and 174 may be sequentially applied or connected to the load device 44 and are otherwise completely isolated from each other as may be desired.

In the operation of the control apparatus in accordance with the present invention and as shown in Figs. 2, 3 and 4, the switching circuits are operative for switching input voltages and each include two transistor switching devices for each input voltage. These transistors are normally operated in the cut-off state with a pulse transformer coupling arrangement being used to furnish the base drive to insure that the direct current level at the load device will be set by the desired input voltage source and not by the base drive voltage. It should be noted that the switching circuits are bipolar in operation, such that one or more of the input voltages may be of opposite polarity than as shown in Figs. 2, 3 and 4.

To explain the operation of the present voltage control apparatus, and particularly as shown in Fig. 2, assume for purposes of example that the first input voltage from the source 40 is 10 volts D. C., the second input voltage from the source 48 is 30 volts D. C., and the third input voltage from the source 52 is 20 volts D. C. The timing control device 84 will sequentially energize the control pulse sources 82, 94 and 96 such that when the control pulse source 82 is energized the other control pulse sources 94 and 96 will not be energized. When the control pulse source 82 is energized, a suitable pulse is applied to the primary winding 80 of the transformer 68 having the indicated polarity to drive the transistor devices 56 and 72 into saturation, with the second transistor device 72 permitting base current to flow in the first transistor device 56 which switches the input voltage source 10 across the load device 44. The second transistor device 88 of the second switching circuit 50, and the second transistor device 92 of the third switching circuit 54, prevents the first input voltage of 10 volts from the source 40 from feeding back into the second input voltage source 48 and the third input voltage source 52. This is of primary importance when the greater input voltages from the sources 48 and 52 are applied across the load device 44 than is the case when the first input voltage source 40 of 10 volts is applied across the load device 44. Upon removal of the sampling pulse from the first primary winding 80, the first transistor device 56 and the second transistor device 72 are open-circuited to isolate the first input voltage source 40 from the load device 44. The timing control 84 may now energize the control pulse source 94 and deenergize the control pulse source 82 and the control pulse source 96. When the control pulse source 94 is energized, the second transistor device 88 of the second switching circuit is made conductive from the emitter electrode to the base electrode which makes the second transistor device 88 conductive from the emitter electrode to the collector electrode. This alloys current to flow from the first secondary winding of the transformer device through the second transistor device 88 to be applied across the first transistor device 86 between the base electrode and the emitter electrode to make the first transistor device 86 conductive between the collector electrode and the emitter electrode to thereby allow current flow from the second input voltage source 48 through the emitter-collector circuit of the first transistor device 86 to the load device 44. When the control pulse source 94 is deenergized, the second transistor device 88 stops conducting to thereby terminate the conductivity of the first transistor device 86.

When the emitter-collector circuit of the first transistor device 86 is conductive to thereby apply the 30 volt second input voltage to the load device, this provides across, for example, the first transistor device 56 of the first switching circuit 42, a difference voltage of 30 volts minus 10 volts or 20 volts drop, with the emitter electrode 60 being more positive thereby than the collector electrode 58. The collector electrode 74 of transistor 72 and the emitter electrode 60 of transistor 56 prevent this voltage difference from feeding back through the first input source 40. The same operation is true for the third switching circuit 54 relative to the second input voltage of 30 volts being applied across the load device 44.

When the timing control 84 energizes the control pulse source 96, the third input voltage of 20 volts from the source 52 is applied across the load device 44, and the first and second timing circuits 42 and 50 isolate respectively the first and second input voltage sources 40 and 48 from the load device 44.

In the voltage control apparatus shown in Fig. 3 the battery or potential source 118 is operative to further bias the first transistor device 102 in the cut-off or nonconductive condition. This would have the effect of substantially reducing the leakage current. A low voltage battery in the order of one or two volts should be sufficient. When the control pulse source 130 is energized by the timing control 132, the first transistor device 110 is made conductive by the operation of the second secondary winding 122 making the base electrode 116 positive relative to the emitter electrode 112. The voltage developed in the first secondary winding 120 to cause the first transistor device 102 to be conductive through the second transistor device 110 must be of sufficient magnitude to make the base electrode 108 sufficiently positive relative to the emitter 106 and to overcome the potential of the battery 118. The operation of the switching circuit 100 and the similar switching circuit 131 in other respects is similar to the operation of the individual switching circuits 82, 94 and 96 shown in Fig. 2.

In Fig. 4, the battery 154 is connected to be operative as a forward bias for the first transistor device 138, or in other words, to assist in making the first transistor device 138 conductive. When the control pulse source 162 is energized by the timing control 164, a switching or control pulse is applied to the first primary winding 160 to energize the secondary winding 156 to make the base electrode 152 of the second transistor device 146 positive relative to the emitter electrode 148. This causes the transistor device 146 to be conductive through the battery of potential device 154 to make the emitter 142 of the first transistor device 138 negative relative to the base electrode 144. This causes the first transistor device 138 to be conductive in its collector-emitter circuit such that the input voltage from the source 134 is applied across the load device 44.

Figure 6:
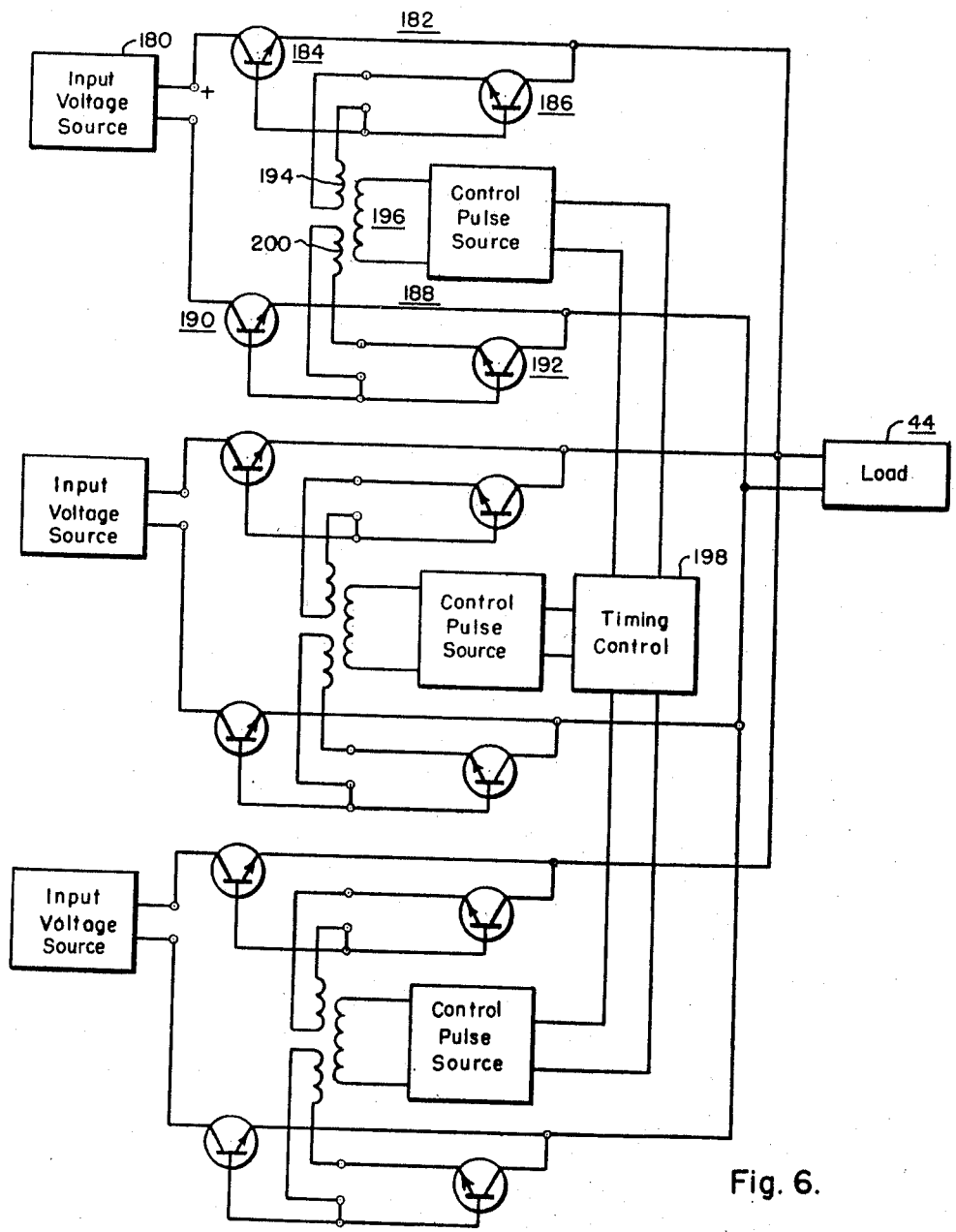
Fig. 6 shows an additional modification of the voltage control apparatus in accordance with the present invention.

By using four transistors per input voltage, as shown in Fig. 6, the input voltage sources can be completely isolated from each other for the electronic equivalent of the double-pole electromechanical switch arrangement shown in Fig. 5. To connect input voltage source 180 to the load device 44, both of transistor switch 182, including transistor devices 184 and 186, and transistor switch 188, including transistor devices 190 and 192, are energized. The base electrodes of transistor devices for each transistor switch are connected together. The forward drive for transistor 186 is transmitted on to drive transistor 184 into saturation. This results from the low collector electrode to emitter electrode drop in a junction type of transistor device. Therefore, both of transistors 186 and 184 are turned "on" and made conductive by the one secondary winding 194 of transformer 196 as determined by the timing control 198. The same operation holds true for the other transistor switch 188 shown in Fig. 6, which is energized by secondary winding 200. The other transistor switches are similarly operative as determined by the timing control 198.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention. For example, negative direct current voltage can be switched by using PNP transistors and properly rearranging the battery polarities and transistor energizing voltages.

I claim as my invention:

1. In voltage control apparatus for switching a voltage responsive load between a source of a first input voltage and a source of a second input voltage, the combination of a first electrically conductive device having first, second and third electrodes, a second electrically conductive device having first, second and third electrodes, with the first electrode of the first device being connected to the first voltage source, with the first electrode of the second device being connected to the second voltage source, a source of a first switching control pulse connected between the second and third electrodes of the first device for controlling the operation of said first device, a source of a second switching control pulse connected between the second and third electrodes of the second device for controlling the operation of the second device.

2. In voltage control apparatus for switching a voltage responsive load between a first input voltage source and a second input voltage source, the combination of a first switching circuit connected between said first input voltage source and said load and including first and second electrically conductive devices, with each of said first and second devices have respectively first and second electrodes, a second switching circuit connected between said second input voltage source and said load and including third and fourth electrically conductive devices, with each of said third and fourth devices having respectively first and second electrodes, a source of a first switching control voltage connected between the first and second electrodes of the first device, said first switching control voltage source being connected in series with said first device between the first and second electrodes of the second device, a source of a second switching control voltage connected between the first and second electrodes of the third device, and with said second switching control voltage source being connected in series with the third device between the first and second electrodes of the fourth device.

3. In voltage control apparatus for switching a voltage responsive load between a source of a first input voltage and a source of a second input voltage, the combination of a first switching circuit connected between said load and the first input voltage source, a second switching circuit connected between the load and the second input voltage source, a source of a first switching voltage, a source of a second switching voltage, with said first switching circuit including a first electrically conductive device connected to said first switching voltage source for controlling the conductivity of said first device and a second electrically conductive device connected through said first device to said first switching voltage source for controlling the conductivity of the second device, with said second switching circuit including a third electrically conductive device connected to said second switching voltage source for controlling the conductivity of the third device and a fourth electrically conductive device connected through said third device to said second switching voltage source for controlling conductivity of said fourth device.

4. In voltage control apparatus for sampling an input voltage source across a voltage responsive load, the combination of a first electrically conductive device including a control electrode and being connected between said input voltage source and said load, a second electrically conductive device, a source of a sampling control voltage connected to said second device for controlling the conductivity of the second device, with said control electrode being connected through the second device to said sampling voltage source for controlling the conductivity of the first device between said input voltage source and the load.

5. In voltage control apparatus for sampling a first input voltage source across a voltage responsive load and a second input voltage source across said voltage responsive load, the combination of a first electrically conductive device including a control electrode and being connected between said first input voltage source and said load, a second electrically conductive device including a second control electrode and being connected between said second input voltage source and said load, a source of a sampling control voltage, a third electrically conductive device connected to said sampling voltage source for controlling the conductivity of said third device, with said first control electrode being connected through said third device to said sampling voltage source for controlling the conductivity of said first device between said first input voltage source and said load, a fourth electrically conductive device connected to said sampling voltage source for controlling the conductivity of said fourth device, with said second control electrode being connected through said fourth device to said sampling voltage source for controlling the conductivity of said second device between said second input voltage source and said load.

6. In voltage control apparatus for switching a voltage responsive load between a plurality of input voltage sources, the combination of a plurality of switching circuits, with each of said switching circuits being connected respectively between said load and one of said input voltage sources, a plurality of switching control voltage sources, with each of said switching circuits including one electrically conductive device connected respectively one of said switching control voltage sources for controlling the conductivity of said one electrically conductive device, and with each of said switching circuits including a second electrically conductive device connected through its respective first conductive device to respectively one of said switching control voltage sources for controlling the conductivity of said second device and thereby the operation of that respective switching circuit.

No references cited.